United States Patent
Cabello-Fuentes

(10) Patent No.: US 6,676,917 B2
(45) Date of Patent: Jan. 13, 2004

(54) PROCESS FOR THE PRODUCTION OF HYDROCHLORIC ACID AND NEUTRALIZED SULFATES

(76) Inventor: José Cabello-Fuentes, Calle 8 Lote $3^a$ Manzana 26, Colonia Petrolera, Minatitlán, Veracruz (MX), 96850

( * ) Notice: Subject to any disclaimer, the term of this patent is extended or adjusted under 35 U.S.C. 154(b) by 346 days.

(21) Appl. No.: 09/788,140

(22) Filed: Feb. 16, 2001

(65) Prior Publication Data

US 2002/0114759 A1 Aug. 22, 2002

(51) Int. Cl.$^7$ .............. C01B 7/01; C01D 5/00
(52) U.S. Cl. ............ 423/482; 423/488; 423/551; 423/552
(58) Field of Search .............. 423/481, 482, 423/551, 552, 488

(56) References Cited

U.S. PATENT DOCUMENTS

| | | | | |
|---|---|---|---|---|
| 2,275,825 A | * | 3/1942 | Lewis | 423/482 |
| 2,816,820 A | * | 12/1957 | Pernert | 423/193 |
| 3,920,801 A | * | 11/1975 | Grotheer | 423/477 |
| 3,998,935 A | * | 12/1976 | Adams et al. | 423/552 |
| 4,054,543 A | | 10/1977 | Batorewicz | 260/2.5 |
| 4,371,512 A | * | 2/1983 | Sardisco et al. | 423/551 |
| 4,588,573 A | | 5/1986 | Worthington et al. | 423/552 |
| 6,242,042 B1 | * | 6/2001 | Goldstein et al. | 427/2.3 |

* cited by examiner

*Primary Examiner*—Ngoc-Yen Nguyen
(74) *Attorney, Agent, or Firm*—Abelman, Frayne & Schwab

(57) ABSTRACT

A process for the production of hydrochloric acid and neutralized sulfates comprising: reacting sulfuric acid with an alkaline metal chloride in order to obtain a liquor containing hydrochloric acid, an acid alkaline metal sulfate and an excess of sulfuric acid; separating the hydrochloric acid from the liquor containing the hydrochloric acid, the acid alkaline metal sulfate and the excess of sulfuric acid; neutralizing the acid alkaline metal sulfate and the excess sulfuric acid by adding to the remaining liquor after the separation of the hydrochloric acid a neutralizing agent to obtain a neutralized mass; cooling the neutralized mass to crystallize the neutralized alkaline metal sulfate and obtain neutralized alkaline metal sulfate crystals; and separating the neutralized alkaline metal sulfate crystals from the liquor.

26 Claims, No Drawings

PROCESS FOR THE PRODUCTION OF HYDROCHLORIC ACID AND NEUTRALIZED SULFATES

FIELD OF THE INVENTION

The present invention relates to processes for the production of sulfates and hydrochloric acid and, more particularly, to a process for the production of hydrochloric acid and neutralized sulfates without the need of any diluting step.

DESCRIPTION OF THE RELATED ART

Hydrochloric acid is broadly used in domestic operations, as well as in industry in which it has very important applications, such as a pickling agent in the iron and steel industry, as a well re-activator in the petroleum industry and generally as a descaling agent.

More than 3.5 tons of HCl are produced and consumed annually just in the U.S.A.

The most commonly used process for the production of hydrochloric acid in industry employs as raw materials elemental residual hydrogen and elemental chlorine generated by the caustic soda plants produced by the sodium chloride electrolysis process. Notwithstanding its high production cost, however, it is the best use for the residual hydrogen.

The first antecedent of an industrial process for the production of hydrochloric acid dates from the 18th century and is denominated the "LEBLANC" process, which reacts concentrated sulfuric acid and crystalline sodium chloride on a dry basis in order to produce hydrochloric acid and sodium sulfate.

Hydrochloric acid has been well know since the era of the alchemist as the "salt spirit", according to works and studies attributed to Basilius Valentinus in the 15th century, when hydrochloric acid was produced by reacting sulfuric acid with sodium chloride on a dry basis.

In such processes, the chemical reaction is the following:

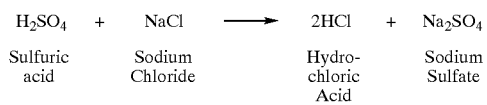

The low efficiency of the furnaces used for the production of hydrochloric acid via the dry basis process, the high pollution levels produced, its high energy consumption and the low quality of the products obtained with said furnaces led to research on a process which can be carried out under more moderate conditions. As a result of these investigations, it was found that by reacting sulfuric acid with sodium chloride on a wet basis, it was possible to produce hydrochloric acid at temperatures below 300° F., but instead of producing a neutralized sodium sulfate, acid sodium sulfate and hydrochloric acid were obtained in accordance with the following reaction:

The majority of the processes that operate on a wet basis, separate the hydrochloric acid from the acid sulfates produced by distillation at temperatures between 65° C. and 150° C., even if the hydrochloric acid can be separated from the sulfates by solvent extraction.

Also, the processes which operate on a wet basis use excess sulfuric acid in order to complete the reaction at a 100% and to ease the complete separation of the hydrochloric acid by distillation.

The acid sodium sulfate is a very corrosive product and for all practical purposes it does not have any commercial value. Accordingly, the processes which operate on a wet basis and which have as raw materials sulfuric acid and ammonium or alkaline metal chlorides, require additional steps in order to transform the acid sulfates into neutralized sulfates.

U.S. Pat. No. 4,054,543 of Sardisco, discloses a process for the production of potassium sulfate and hydrochloric acid on a wet basis using as raw materials sulfuric acid and potassium chloride.

U.S. Pat. No. 4,588,573 of Worthington et al., discloses a process for the production of hydrochloric acid and potassium sulfate using as raw materials sulfuric acid and potassium chloride. In the process of U.S. Pat. No. 4,588,573, once it has generated the acid potassium sulfate and separated the hydrochloric acid by distillation, the mass is cooled in order to crystallize the acid potassium sulfate and to separate it from the liquor by centrifugation and distillation, said liquor being recycled to the reactor.

The acid potassium sulfate crystals separated by centrifugation are transferred for a partial dissolution to an agitated tank called converter, in which a partial conversion of the acid sulfate to a neutralized sulfate is carried out, using the liquor of a second crystallization as dissolution agent.

Subsequently, the already converted crystals are separated from the liquor and are fed to an evaporator in order to reduce the water content in the system, thus making it possible for the process to work adequately.

The converted and separated crystals in the last step are transferred to a second agitated tank, denominated a converter, in which said crystals are dissolved with water at carefully controlled volumes.

With a final mass cooling step a second crystallization is obtained, thus yielding neutralized potassium sulfate crystals.

Furthermore, Worthington discloses a system phase diagram (sulfuric acid-potassium sulfate-water) in which three well defined zones are shown. In the A zone, only neutralized potassium sulfate is crystallized; in the B zone a mix of acid potassium sulfate and neutralized potassium sulfate is crystallized, and in the C zone, characterized by its low water content and its high sulfuric acid content, acid sodium sulfate with sulfuric acid is crystallized.

In accordance with Worthington's phase diagram, it is possible to move the system from the B zone to the A zone only by a simple dilution operation, since the dilution operation lowers the sulfuric acid concentration and thus it is possible to crystallize neutralized sodium sulfate by a cooling operation.

The first crystallization step of acid potassium sulfate is very important and necessary to Worthington's process in order to carry on the subsequent steps, since the acid potassium sulfate crystals separated by centrifugation remain without any water content and without excess of sulfuric acid.

The acid potassium sulfate crystals may be represented in a re-arranged molecular system suggested by Worthington, as a mix of 64% of neutralized potassium sulfate and 36% of sulfuric acid, said resulting mixture remaining clearly located in the B zone of the phase diagram.

When the referenced mixture is diluted until its water content is about 50%, the mass changes from the B zone to the A zone, in which neutralized potassium sulfate is crystallized by cooling.

The referenced molecular re-arrangement can be represented by the next equation in which the molecular weights have been included in order to quantify the contents of the mixture:

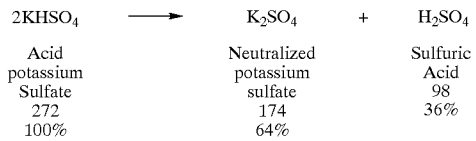

| 2KHSO$_4$ | → | K$_2$SO$_4$ | + | H$_2$SO$_4$ |
|---|---|---|---|---|
| Acid potassium Sulfate | | Neutralized potassium sulfate | | Sulfuric Acid |
| 272 | | 174 | | 98 |
| 100% | | 64% | | 36% |

Both processes disclosed in the U.S. Pat. No. 4,054,543 and in the U.S. Pat. No. 4,588,573 employ the same raw materials, and almost the same reaction temperatures and sulfuric acid excesses.

The first difference between the two above-referenced processes is related to the hydrochloric acid distillation system. The Sardisco process, in comparison with the Worthington process, evaporates a larger water volume contained in the reacting mass until a magma is formed inside the reactor containing mixed crystals of acid potassium sulfate crystals and neutralized potassium sulfate in a liquor. Once the hydrochloric acid is separated in the evaporation step, and without separating the crystals, water is again added to the reactor until the mass is changed from the B zone to the A zone of the phase diagram, thus converting the original magma with mixed crystals to a magma containing only neutralized potassium sulfate crystals which are separated by centrifugation or filtration for subsequent drying and commercialization.

Worthington's process consumes less energy than the process of Sardisco because it has to evaporate less water. However, the Worthington process requires larger and more complex equipment compared with Sardisco's process and, thus, for Worthington's process, the fixed investment is higher for the same production capacity than that of Sardisco's process.

In view of the above-referenced disadvantages, the instant process for the production of hydrochloric acid and neutralized sulfates has been developed having a low energy consumption and a low fixed investment.

The process comprises the steps of: a) reacting sulfuric acid with an alkaline metal chloride in order to obtain a liquor containing hydrochloric acid and an acid alkaline metal sulfate; b) separating the hydrochloric acid from the liquor containing the hydrochloric acid, the acid alkaline metal sulfate and an excess of sulfuric acid; c) neutralizing the acid alkaline metal sulfate and the sulfuric acid excess by adding to the remaining liquor, after the separation of the hydrochloric acid, a neutralizing agent; d) cooling the neutralized mass in order to crystallize the neutralized alkaline metal sulfate; and e) separating the crystals of neutralized alkaline metal sulfate from the liquor.

The instant process requires only a small quantity of equipment and it only needs to evaporate a volume of water sufficient to obtain a hydrochloric acid concentration of 30%. It is, accordingly, not necessary to evaporate the diluting water, as is the case with other processes operating on a wet basis, since with applicant's process the mass issuing from the reactor is fed directly and cooled inside a crystallization vessel, into which a neutralizing agent is added, which allows a cold magma of neutralized sulfate to be obtained without any diluting step.

Furthermore, with applicant's process it is possible to transform all the sulfuric acid used in the process to sodium sulfate and ammonium sulfate, using sodium chloride and sodium carbonate as the sodium source and using ammonia as the nitrogen source.

With applicant's process, it is also possible to transform a percentage of the chlorine (60%) contained in the sodium chloride used to hydrochloric acid, and another part (40%) to ammonium chloride.

Since with applicants process it is not necessary to evaporate diluting waters, a low energy consumption is achieved, and due to the small amount of equipment used, it is possible to reduce the investment and production costs when compared to the costs of the prior art processes.

Applicant's process may also be applied within the context of the well-known Solvay process, which can be represented by the following equations:

$$CaCO_3+C+O_2 \rightarrow CaO+2CO_2 \quad (1)$$

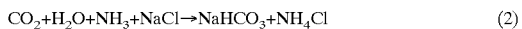

$$CO_2+H_2O+NH_3+NaCl \rightarrow NaHCO_3+NH_4Cl \quad (2)$$

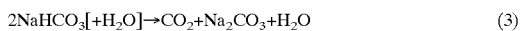

$$2NaHCO_3[+H_2O] \rightarrow CO_2+Na_2CO_3+H_2O \quad (3)$$

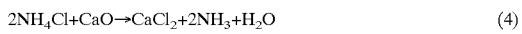

$$2NH_4Cl+CaO \rightarrow CaCl_2+2NH_3+H_2O \quad (4)$$

The Solvay process is designed to produce sodium carbonate and during the separation of sodium bicarbonate, a filtered solution remains, comprising mainly ammonium bicarbonate, ammonium chloride, sodium chloride and water.

In the traditional Solvay process, the filtered solution is treated with a lime slurry in order to transform the ammonium chloride to calcium chloride and ammonia which is separated by distillation together with the ammonium bicarbonate in order to recover the ammonia in a solution of 15%, by weight, and to recycle it to the process. This results in a very dilute solution of unpurified calcium chloride (with a maximum concentration of 10.5%) as the distillation residue, with the unreacted sodium chloride, which requires a costly concentration process for its commercialization.

When applicant's process is directly applied to the treatment of the filtered solution, it significantly reduces the fixed investment since once the sodium bicarbonate is separated, the filtered solution is treated with sulfuric acid and ammonia in sufficient quantities so as to produce hydrochloric acid and neutralized ammonium and sodium sulfate.

SUMMARY OF THE INVENTION

It is therefore a main object of the present invention, to provide a process for the production of hydrochloric acid and neutralized sulfates which is able to transform all the sulfuric acid used in the process to sodium sulfate and ammonium sulfate, using as the sodium source, sodium chloride and sodium carbonate as the sodium source and using ammonia as the nitrogen source.

It is also a main object of the present invention, to provide a process of the above disclosed nature which is capable of transforming a percentage of the chlorine (60%) contained in the sodium chloride used, on hydrochloric acid, and another part (40%) on ammonium chloride.

It is an additional object of the present invention to provide a process of the above disclosed nature which only needs a small equipment.

It is another main object of the present invention, to provide a process of the above disclosed nature which only requires the evaporation of a volume of water sufficient to obtain a hydrochloric acid concentration of 30%, by virtue of which it is not necessary to evaporate the diluting water used with other processes operating on a wet basis.

It is still another object of the present invention to provide a process of the above disclosed nature having a low energy consumption and a low fixed investment.

These and other objects and advantages of the present invention will be apparent to those persons having ordinary skill in the art, from the following detailed description of the invention.

DETAILED DESCRIPTION OF THE INVENTION

The invention will be described by making reference to preferred embodiments of the process for the production of hydrochloric acid and neutralized sulfates.

In a first embodiment of the invention, in order to produce hydrochloric acid and neutralized sodium sulfate, the raw materials that must be used are sulfuric acid and sodium chloride, and for these raw materials the neutralizing agent may be sodium carbonate or sodium hydroxide.

The process for the production of hydrochloric acid and neutralized sulfates in accordance with the first embodiment thereof, comprises the steps of:

a) reacting sulfuric acid and sodium chloride in order to obtain a liquor containing hydrochloric acid and acid sodium sulfate in accordance with the following reaction:

$$H_2SO_4 + NaCl \rightarrow NaHSO_4 + HCl$$

b) separating the hydrochloric acid from the liquor containing the hydrochloric acid, acid sodium sulfate and an excess of sulfuric acid by evaporation and subsequently condensing the evaporation product by cooling at a temperature of between 80° C. to 125° C. in order to obtain a solution of water and hydrochloric acid at a concentration of 28% to 32%;

c) adding to the remaining liquor containing acid sodium sulfate after the separation of the hydrochloric acid, a neutralizing agent comprising sodium carbonate in order to neutralize the excess sulfuric acid and to transform part of the acid sodium sulfate to neutralized sodium sulfate in accordance with the following reactions:

$$H_2SO_4 + Na_2CO_3 \rightarrow Na_2SO_4 + CO_2 + H_2O$$

$$2NaHSO_4 + Na_2CO_3 \rightarrow 2Na_2SO_4 + CO_2 + H2O;$$

d) cooling the neutralized mass in order to crystallize the neutralized sodium sulfate; and e) separating the crystals of neutralized sodium sulfate from the liquor by filtration.

By the addition of the neutralizing agent, it is not necessary to dilute the mass in order to change the equilibrium point from zone B to zone A of Worthington's phase diagram.

The volume of the liquor generated is so small that not only is it not necessary to evaporate the water but, on the contrary, it is necessary to add a small quantity of water in order to maintain the system's equilibrium.

In a second embodiment of the invention, in order to produce hydrochloric acid and neutralized potassium sulfate, the raw materials that must be used are sulfuric acid and potassium chloride, and for these raw materials the neutralizing agent may be potassium carbonate or potassium hydroxide.

The process for the production of hydrochloric acid and neutralized sulfates in accordance with the second embodiment thereof, comprises the steps of:

a) mixing sulfuric acid and sodium carbonate in order to obtain a liquor containing hydrochloric acid and acid potassium sulfate in accordance with the following reaction:

$$H_2SO_4 + KCl \rightarrow HCl + KHSO_4$$

b) separating the hydrochloric acid from the liquor containing the hydrochloric acid, acid sodium sulfate and an excess of sulfuric acid by evaporation and subsequently condensing the evaporation product by cooling at a temperature of between 80° C. to 125° C. in order to obtain a solution of water and hydrochloric acid at a concentration of about 28% to about 32%;

c) adding to the remaining liquor containing acid potassium sulfate, after the separation of the hydrochloric acid, a neutralizing agent comprising potassium carbonate in order to neutralize the excess sulphuric acid and to transform part of the acid potassium sulfate to neutralized potassium sulfate in accordance with the following reactions:

$$H_2SO_4 + K_2CO_3 \rightarrow K_2SO_4 + CO_2 + H_2O$$

$$2KHSO_4 + K_2CO_3 \rightarrow 2K_2SO_4 + CO_2 + H_2O$$

d) cooling the neutralized mass in order to crystallize the neutralized potassium sulfate; and e) separating the crystals of neutralized potassium sulfate from the liquor by filtration.

In this case, the equilibrium point of the mass remains located in zone A of Worthington's diagram phase.

In the instance when potassium chloride or ammonium chloride are used as raw materials and also as a source of chloride, instead of sodium chloride, the best neutralizing agent is ammonia, since the crystals contained in the crystallizing vessel are comprised of double ammonium and potassium sulfate if potassium chloride is used, or of ammonium sulfate if ammonium chloride is used.

The capacity of economically transforming the potassium chloride to a double ammonium and potassium sulfate with sulfuric acid and ammonia in accordance with the present invention is very important from an agronomic point of view since by the process of the present invention the chloride ion, which is toxic to many cultivated crops, is eliminated from the final product, and soluble nitrogen and sulfur are added to the product, thus improving its quality, while hydrochloric acid is laterally produced.

In the instance when ammonia is used as the neutralizing agent, ammonium potassium sulfate will be produced as previously described and in accordance with the following reaction:

$$KHSO_4 + NH_3 \rightarrow KNH_4SO_4$$

It is possible to use great volumes of sulfuric acid coming from the mining industry in order to produce sodium sulfate, ammonium sulfate or ammonium chloride, especially in locales where the consumption of hydrochloric acid is very low. This can be achieved by:

a) reacting ammonia and sulfuric acid in a first reaction vessel having agitating means, in order to obtain a saturated solution of ammonium sulfate in accordance with the following reaction:

$$H_2SO_4 + 2NH_3 \rightarrow (NH_4)_2SO_4$$

b) reacting the resultant saturated solution of ammonium sulfate with sodium chloride crystals inside a second reaction vessel in order to obtain a solution of ammonium chloride and sodium sulfate in accordance with the following reaction:

$$(NH_4)_2SO_4 + 2NaCl \rightarrow Na_2SO_4 + 2NH_4Cl$$

c) crystallizing the solution of ammonium chloride and sodium sulfate at a temperature of between about 50° C. and about 105° C., preferably about 80° C., in order to crystallize about 40% of the total of the sodium sulfate obtained;

d) separating the sodium sulfate crystals from the solution by filtration or centrifugation, preferably by a first filtration operation;

e) cooling the solution of the first filtration operation at a temperature of between about 5° C. and about 60° C., preferably at 30° C., in order to crystallize about 35% of the total ammonium chloride obtained;

f) separating the ammonium chloride crystals by filtration or centrifugation, preferably by a second filtration operation;

The remaining solution after the second filtration operation which contains unreacted sodium sulfate, ammonium chloride, sodium chloride and water may be reused in order to obtain hydrochloric acid and neutralized ammonium and sodium sulfate by the following sequence:

a) reacting the solution from the second filtration with sulfuric acid inside a third reaction vessel in order to obtain a mass containing hydrochloric acid, acid sodium sulfate and acid animonium sulfate in accordance with the following reactions:

$$H_2SO_4 + NaCl \rightarrow HCl\ NaHSO_4$$

$$Na_2SO_4 + H_2SO_4 \rightarrow 2NaHSO_4$$

$$NH_4Cl + H_2SO_4 \rightarrow NH_4HSO_4 + HCl$$

b) feeding the mass to a fourth reaction vessel having agitating means in order to complete the above-referenced reactions and to distill water and hydrochloric acid as a solution of about 28% to about 32%, by weight;

c) feeding the mass free of hydrochloric acid to a fifth reaction vessel in order to react said mass with sodium carbonate and ammonium hydroxide in order to transform the acid sodium sulfate and acid ammonium sulfate to neutralized sulfates in accordance with the following reactions:

$$2NaHSO_4 + Na_2CO_3 \rightarrow 2Na_2SO_4 + CO_2 + H_2O$$

$$NH_4HSO_4 + NH_4OH \rightarrow (NH_4)_2SO_4 + H_2O;$$

d) crystallizing and separating the neutralized sodium and ammonium sulfate.

The remaining solution after the crystallization of the sodium and ammonium sulfate may be recycled to the process in order to recover the products in the solution.

For the purpose of properly treating calcium sulfate generated as a residue in the production of phosphogypsum, the above step of reacting, in a first reaction vessel having agitating means, ammonia and sulfuric acid in order to obtain a saturated solution of ammonium sulfate, can be omitted in order to directly react the calcium sulfate, instead of ammonium sulfate, with sodium chloride crystals in accordance with the process of the present invention and its subsequent steps.

In a third embodiment of the invention, the process of the present invention is applied in conjunction with the Solvay process, wherein the filtered solution, remaining after the separation of the sodium bicarbonate, containing ammonium bicarbonate, ammonium chloride, sodium chloride and water is treated by the following steps:

f) reacting the filtered solution with sulfuric acid in order to obtain a solution containing hydrochloric acid, ammonium sulfate, carbon dioxide and water in accordance with the following reaction:

$$H_2SO_4 + NaCl \rightarrow HCl + NaHSO_4$$

$$NH_4Cl + H_2SO_4 \rightarrow NH_4HSO_4 + HCl$$

$$[NH_4HSO_4]NH_4HCO_3 + H_2SO_4 + NH_3[+] \rightarrow (NH_4)_2SO_4 + CO_2 + H_2O;$$

g) separating the hydrochloric acid from the solution by distillation in order to obtain a solution containing acid ammonium sulfate and acid sodium sulfate;

h) neutralizing the acid ammonium sulfate and acid sodium sulfate with sodium carbonate and ammonium hydroxide in accordance with the following reactions:

$$2NaHSO_4 + Na_2CO_3 \rightarrow 2Na_2SO_4 + CO_2 + H_2O$$

$$NH_4HSO_4 + NH_4OH \rightarrow (NH_4)_2SO_4 + H_2O$$

i) separating the neutralized ammonium sulfate and sodium sulfate by fractional crystallization.

Finally, it must be understood that the process for the production of hydrochloric acid and neutralized sulfates of the present invention, is not limited exclusively to the above described and illustrated embodiments and that persons having ordinary skill in the art can, with the teaching provided by this invention, make modifications to the process for the production of hydrochloric acid and neutralized sulfates of the present invention, which will clearly be within the true inventive concept and scope of the invention which is claimed in the following claims.

What is claimed is:

1. A process for the production of hydrochloric acid and neutralized sulfates, which comprises:

a) reacting sulfuric acid with an alkaline metal chloride in order to obtain a liquor containing hydrochloric acid, an acid alkaline metal sulfate and an excess of sulfuric acid;

b) separating the hydrochloric acid from the liquor containing the hydrochloric acid, the acid alkaline metal sulfate and an excess of sulfuric acid;

c) neutralizing the acid alkaline metal sulfate and the sulfuric acid excess by adding to the remaining liquor after the separation of the hydrochloric acid, a neutralizing agent to obtain a neutralized mass;

d) cooling the neutralized mass to crystallize the neutralized alkaline metal sulfate and obtain neutralized alkaline metal sulfate crystals; and e) separating the neutralized alkaline metal sulfate crystals from the liquor.

2. The process as claimed in claim 1, wherein the hydrochloric acid is separated from the liquor by evaporation and subsequently condensed by cooling the evaporation product at a temperature of between about 80° C. to about 125° C. in order to obtain a solution of water and hydrochloric acid at a concentration of about 28% to about 32%.

3. The process as claimed in claim 1, wherein the crystals of neutralized sodium sulfate are separated from the liquor by filtration.

4. The process as claimed in claim 1, wherein the alkaline metal chloride comprises sodium chloride, the neutralizing agent comprises sodium carbonate, and the alkaline metal sulfate obtained comprises sodium sulfate.

5. The process as claimed in claim 1, wherein the alkaline metal chloride comprises potassium chloride, the neutralizing agent comprises potassium carbonate, and the alkaline metal sulfate obtained comprises potassium sulfate.

6. The process as claimed in claim 1, wherein the alkaline metal chloride comprises potassium chloride, the neutralizing agent comprises ammonia in order to obtain double potassium sulfate crystals.

7. The process as claimed in claim 1, wherein the alkaline metal chloride comprises ammonium chloride and the neutralizing agent comprises ammonia in order to obtain double ammonium sulfate crystals.

8. A process for the production of an alkaline metal sulfate, ammonium sulfate and ammonium chloride using an excess of sulfuric acid, which comprises the steps of:
   a) reacting ammonia and an excess of sulfuric acid to obtain a saturated solution of ammonium sulfate;
   b) reacting the solution obtained in step a) with alkaline metal chloride crystals to obtain a solution of ammonium chloride and an alkaline metal sulfate;
   c) crystallizing the alkaline metal sulfate to obtain a solution of alkaline metal sulfate crystals;
   d) separating the alkaline metal sulfate crystals from the solution of step c);
   e) crystallizing the ammonium chloride to obtain a solution of ammonium chloride crystals; and
   f) separating the ammonium chloride crystals from the solution of step e).

9. The process as claimed in claim 8, wherein the alkaline metal chloride crystals comprise sodium chloride crystals and the alkaline metal chloride sulfate crystals produced comprise sodium sulfate crystals.

10. The process as claimed in claim 8, wherein step a) is carried out in a reaction vessel having agitating means.

11. The process as claimed in claim 8, wherein step b) is carried out in a reaction vessel.

12. The process as claimed in claim 8, wherein step c) is carried out at a temperature of between about 50° C. and about 105° C., in order to crystallize about 40% of the total alkaline metal sulfate obtained.

13. The process as claimed in claim 8, wherein the separation of the sodium sulfate crystals is made by filtration.

14. The process as claimed in claim 8, wherein the separation of the sodium sulfate crystals is made by centrifugation.

15. The process as claimed in claim 8, wherein step e) is carried out at a temperature between about 5° C. and about 60° C., in order to crystallize about 35% of the total ammonium chloride obtained.

16. The process as claimed in claim 8, wherein the separation of the ammonium chloride crystals is made by filtration.

17. The process as claimed in claim 8, wherein the separation of the ammonium chloride crystals is made by centrifugation.

18. The process as claimed in claim 8, wherein the remaining solution obtained in step e) which comprises unreacted alkaline metal sulfate, ammonium chloride, alkaline metal chloride and water is reused to obtain hydrochloric acid and neutralized ammonium sulfate and alkaline metal sulfate by the following steps:
   g) reacting the solution of step e) with sulfuric acid in order to obtain a solution containing hydrochloric acid, acid alkaline metal sulfate and acid ammonium sulfate;
   h) distilling the hydrochloric acid from the solution obtained in step g);
   i) reacting the mass of step h) with sodium carbonate and ammonium hydroxide to transform the acid alkaline metal and ammonium sulfate to neutralized sulfates; and
   j) crystallizing the alkaline metal sulfate and ammonium sulfate.

19. The process as claimed in claim 8, wherein in step a) a solution of calcium sulfate is employed, produced from phosphogypsum, instead of ammonium sulfate.

20. The process as claimed in claim 18, wherein step g) is carried out in a reaction vessel.

21. The process as claimed in claim 18, wherein step h) is carried out in a reaction vessel having agitating means in order to distill water and hydrochloric acid as a solution of about 28% to about 32%, by weight.

22. The process as claimed in claim 18, wherein step i) is carried out in a reaction vessel.

23. The process as claimed in claim 18, wherein the remaining solution of step j) is recycled to the process in order to recover the products in the solution.

24. The process as claimed in claim 1, applied in conjunction with the Solvay process, wherein in the Solvay process, a filtered solution which remains, after separating out sodium bicarbonate, containing ammonium bicarbonate, ammonium chloride, sodium chloride and water is treated by the following steps:
   f) reacting the filtered solution with sulfuric acid to obtain a solution containing hydrochloric acid ammonium sulfate, carbon dioxide and water;
   g) separating the hydrochloric acid from the solution of step f) in order to obtain a solution containing acid ammonium sulfate and acid sodium sulfate;
   h) neutralizing the acid ammonium sulfate and acid sodium sulfate to obtain neutralized ammonium sulfate and sodium sulfate with sodium carbonate and ammonium hydroxide; and
   i) separating the neutralized ammonium sulfate and sodium sulfate from the solution of step h).

25. The process as claimed in claim 24 wherein step g) is achieved by distillation.

26. The process as claimed in claim 24 wherein step i) is achieved by fractional crystallization.

* * * * *